United States Patent [19]

Cheng

[11] Patent Number: 5,127,664
[45] Date of Patent: Jul. 7, 1992

[54] TROLLEY WITH IMPROVED TELESCOPIC TUBES

[76] Inventor: Chiun-Jer Cheng, 1 Fl., No. 20, Lane 327, Sec. 2, Chung Shan Rd., Chung Ho City, Taipei Hsien, Taiwan

[21] Appl. No.: 766,839

[22] Filed: Sep. 27, 1991

[51] Int. Cl.$^5$ .............................................. B62B 1/12
[52] U.S. Cl. ................................... 280/655; 280/47.18; 280/47.29
[58] Field of Search ............... 280/638, 639, 651, 652, 280/655.1, 655, 659, 654, 47.17, 47.18, 47.24, 47.27, 47.29

[56] References Cited

U.S. PATENT DOCUMENTS

| | | |
|---|---|---|
| 4,858,940 | 8/1989 | Cheng .................................. 280/655 |
| 4,974,871 | 12/1990 | Mao ..................................... 280/655 |
| 5,024,458 | 1/1991 | Kazmark et al. .................... 280/655 |

Primary Examiner—Andres Kashnikow
Assistant Examiner—Richard Camby
Attorney, Agent, or Firm—Poms, Smith, Lande & Rose

[57] ABSTRACT

A trolley with improved telescopic tubes. A main frame has a pair of wheels and a support frame attached to a bottom thereof. The main frame is characterized by three pairs of telescoping tubes with a handle at a top thereof maintaining the pair of tubes in a spaced relationship. An actuating lever is disposed near the handle and, in conjunction with a pair of actuating bars inserted through the pair of tubes, allows the pairs of tubes to telescope.

1 Claim, 6 Drawing Sheets

TROLLEY WITH IMPROVED TELESCOPIC TUBES

BACKGROUND OF THE INVENTION

The present invention relates to a trolley for carrying luggage or the like, and more particularly to a trolley with telescoping tubes.

FIG. 7 of the drawings shows a conventional trolley which generally comprises a main frame 11, a handle 12 fixed on top of the main frame 11, a connector means 13, a pair of wheels 14 attached to the main frame 11, and a support means 15 for carrying articles. A pair of spring-biased balls 21 are received between second and third pairs of tubes 112 and 113. A control means 13, referring to FIG. 8, is provided on first and second pairs of tubes 111 and 112 thereof, which is movable between an upper position, indicated by A, and a lower position, indicated by B. The control means 13 has two upper recesses 23 and 23' and two lower recesses 24 and 24' which form slanted surface.

In an extended status shown in these figures, the control means 13 is fixed in the upper position; hence, the pair of spring-biased balls 22 protrude and support the control means 13.

For a folded status, the control means 13 is moved to the lower position, the lower recesses 24 and 24' forcing spring-biased balls 22 to be received through the tubes 111 and 112, resulting in the second pair of tubes 112 being telescopically received in the first pair of tubes 111.

A disadvantage of the above design is that when extending or folding, the control means needs to be pushed or pulled to operate the spring-biased balls. This results in excessive care needed to be taken by the user.

A further disadvantage arises when the control means is not in the upper position: pulling the trolley will cause the tubes to fold, resulting in inconvenience. Also, when pulling a heavier then usual load, the control means is drawn downward, with a possible folding of the tubes.

It is the purpose of present invention, therefore, to mitigate and/or obviate the above-mentioned drawback in the manner set forth in detail description of the preferred embodiment.

SUMMARY OF THE INVENTION

An object of the present invention is to substantially eliminate defects or drawbacks encountered in the prior art described above.

An other object of the present invention is to provide improved telescoping tubes to enhance the telescopic action as well as improve the trolley's convenience.

These and other objects can be achieved according to the present invention by providing pairs of improved telescoping tubes in which an actuating bar is inserted into a hollow portion of the main frame, the actuating bar being characterized in that two guides with a connecting bar are disposed in a longitudinal direction.

According to the present invention, the actuating bar is inserted into a hollow axial central portion of the main frame of the trolley, so that when the trolley is folded, a pair of actuating bars controls the extending or folding of the trolley in only one operational step.

Other objects, advantages, and novel features of the invention will become more apparent from the following detailed description when taken in conjunction with the accompanying drawings.

DETAILED DESCRIPTION OF THE PREFERRED EMBODIMENTS

Figures 1, 2:
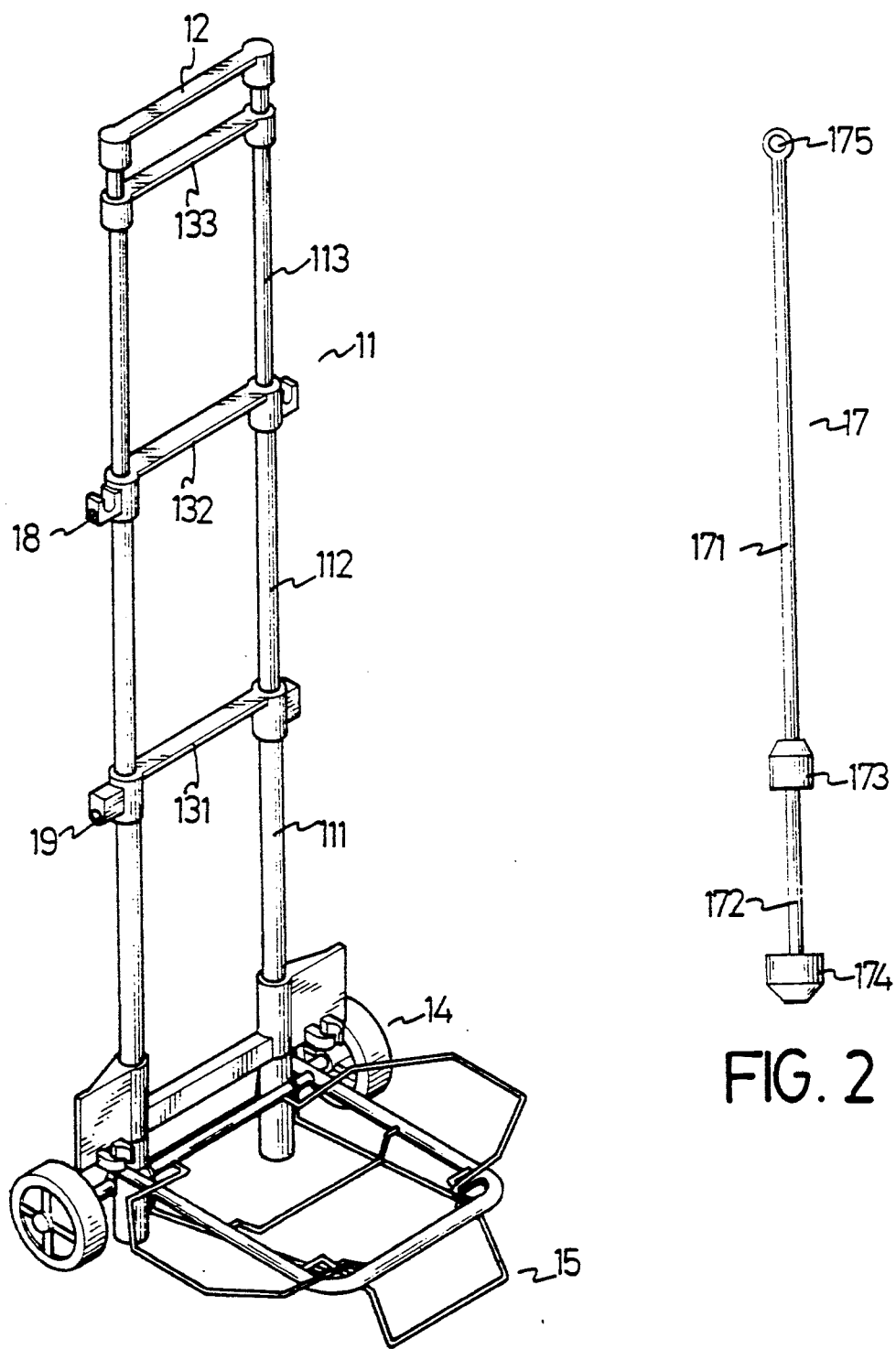
FIG. 1 is perspective view of a trolley with improved telescoping tubes in accordance with the present invention.
FIG. 2 is a plan view of an actuating bar in accordance with the present invention.

Referring to FIG. 1, a trolley according to the present invention comprises a main frame 11, a handle 12, two connector means 131 and 132, a wheel means 14, and a support means 15. The main frame 11 has a first pair of tubes 111, a second pair of tubes 112 telescopically received in the first pair of tubes 111, and a third pair of tubes 113 telescopically received in the second pair of tubes 112.

Figure 3A:
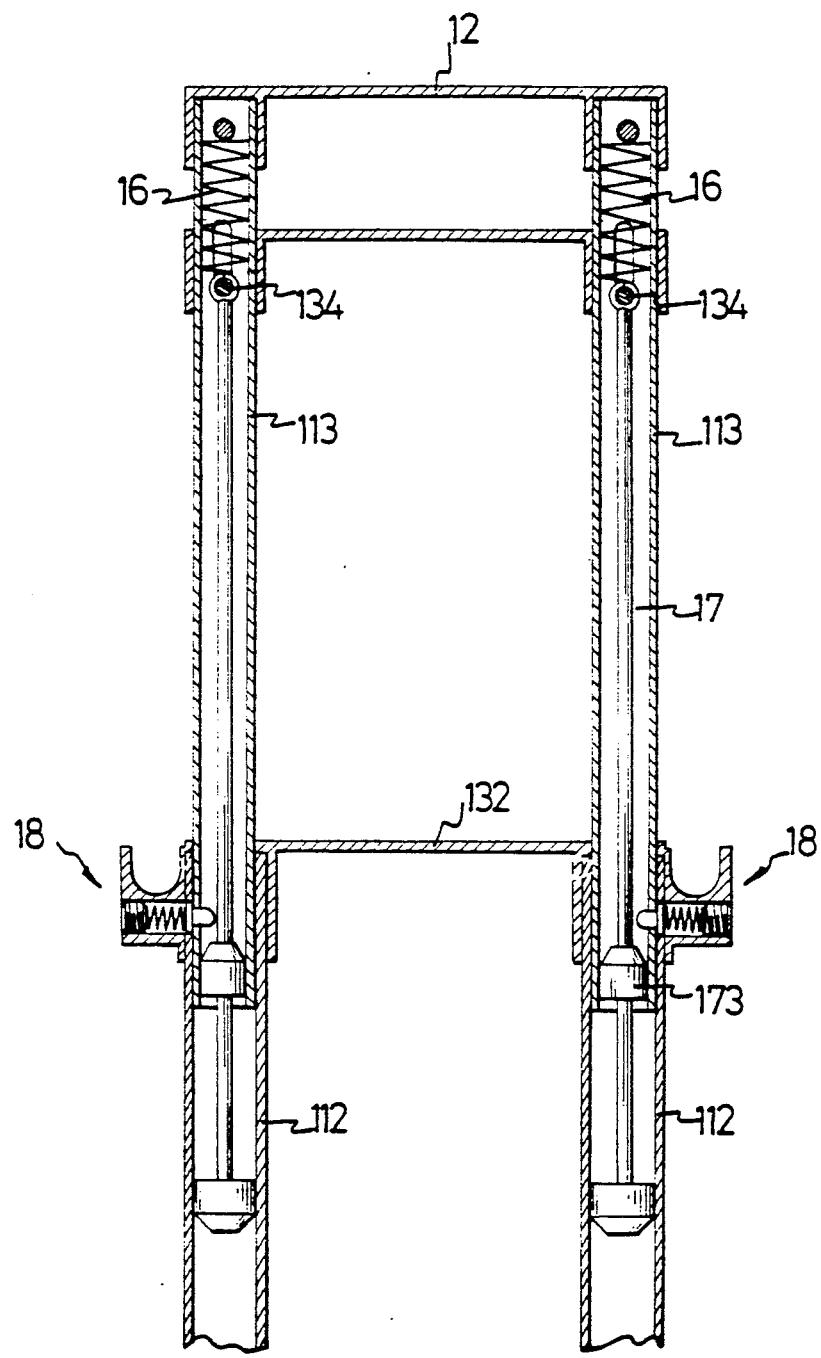
FIG. 3A is a partial cross-sectional view taken along the line III—III of FIG. 1.

Referring to FIGS. 1 and 3A, an actuating lever 133 is disposed on top of the third pair of tubes 113, secured thereto by pins 134, forming free space therebetween, and a pair of springs 16. A second connector means 132 is provided in the second pair of the tubes 112 and the third pair of tubes 113, and has a pair of engaging means 18 disposed at both ends thereof. A first connector means 131 is provided in the first pair of tubes 111 and the second pair of tubes 112, and has a pair of tubes 111 and the second pair of tubes 112, and has a pair of engaging means 19 disposed at both ends of thereof. Also referring to FIG. 4, the engaging means 18 and 19 each have a flat-head screw 181, a spring 182 and a protruded element 183, substantially forming a spring-biased means.

Referring to FIGS. 1 and 2, a pair of actuating bars 17 are inserted into the third pair of tubes 113 of the main frame 11 and pivoted on both ends of the actuating lever 133.

Each actuating bar 17 substantially includes a holder 175, a connecting bar 171, a upper guide 173 tapering upward, a second connecting bar 172, and a lower guide 174 tapering downward.

Referring to FIG. 3A, in an extended status, the spring 16 is unloaded and the actuating bars 17 are freely connected with the pins 134; the upper guides 173 are at a lower position than the second connector means 132, i.e., the distance between the holder 175 and a top point of the upper guide 173 of the actuating bar 17 are longer than the length of the third pair of tubes 113.

Figure 3B:
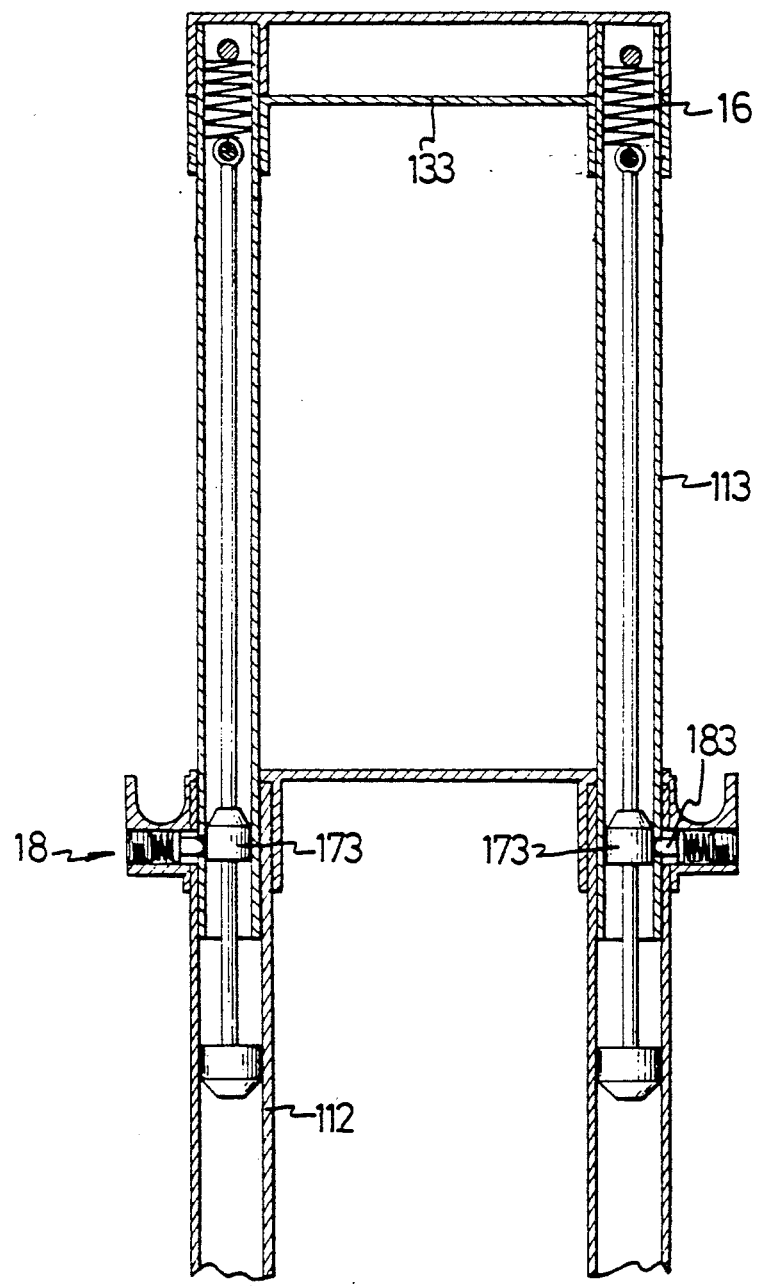
FIG. 3B is a partial cross-sectional view showing a lifting status in accordance with the present invention.

In use, referring to FIG. 3B, by lifting the actuating lever 133 for pressing the spring 16, the upward tapers of the upper guides 173 are forced against the engaging means 18; hence, the protruded element 183 is received the third pair of tubes 113, which are telescopically received in the second pair of tubes 112.

Figures 4, 5:
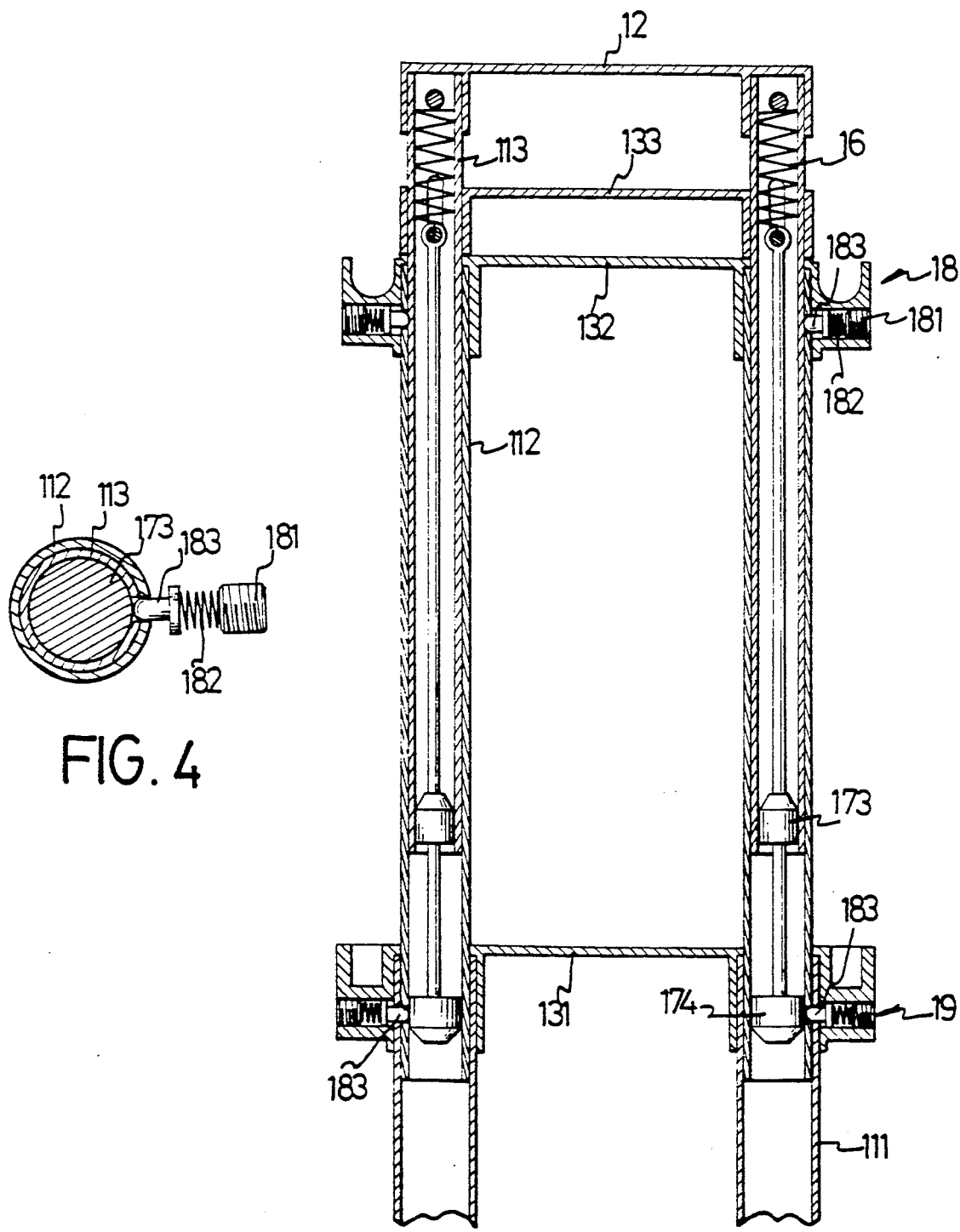
FIG. 4 is a partial cross-sectional view of an engaging means.
FIG. 5 is a partial cross-sectional view showing a half-folded status in accordance with the present invention.
Figure 6:
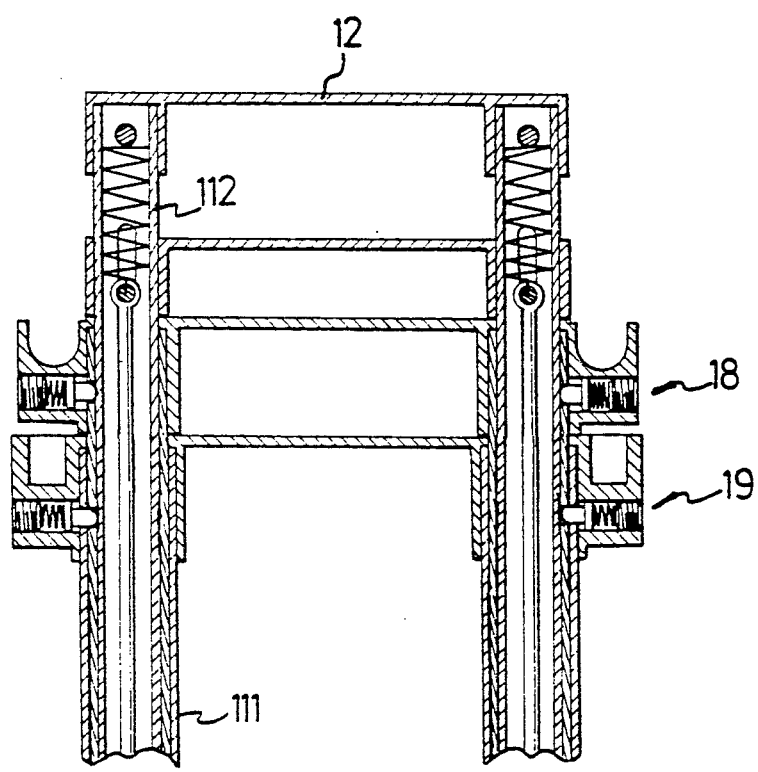
FIG. 6 is a partial cross-sectional view showing a folded status in accordance with the present invention.
Figures 7, 8:
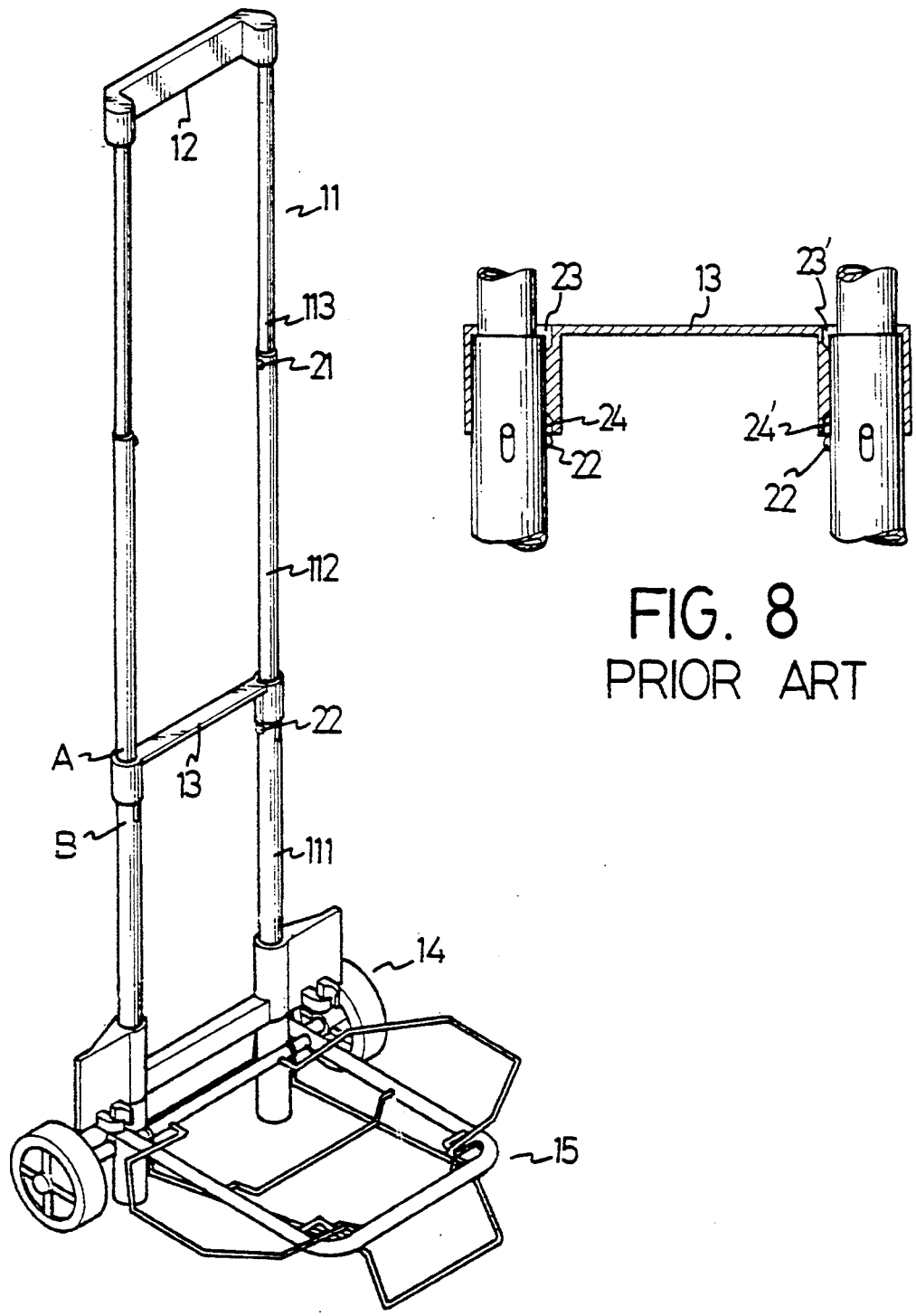
FIG. 7 is a perspective view of a conventional trolley according to prior art.
FIG. 8 is view of a control means according to prior art.

Referring to FIG. 5, when the third pair of tubes 113 are telescopically received in the second pair of tubes 112, the lower guides 174 are forced into the engaging means 19, hence, the protruded element 183 is received and the telescopic tubes 113 and 112 are telescopically received in the first pair of tubes 111, referring to FIG. 6.

For extension, the user reverses the operation steps of the above description. By, using the actuating bars 17 to be engaged or released from the engaged means 18 and 19, the whole operation can be achieved.

Although the invention has been explained in relation to its preferred embodiment, it is to be understood that many other possible modifications and variations can be made without departing the spirit and scope of the invention as hereinafter claimed.

I claim:

1. A trolley comprising:
   a main frame comprising a first pair of tubes, a second pair of tubes being telescopically received in said first pair of tubes, and a third pair of tubes being telescopically received in said second pair of tubes;
   a first connector means for coupling and maintaining in a spaced relationship said first and said second pair of tubes;
   a second connector means for coupling and maintaining in a spaced relationship said second and said third pairs of tubes;
   a handle being disposed between said third pair of tubes at tops thereof;
   a support frame with wheel for carrying articles thereon being attached to said first pair of tubes at bottoms thereof; and
   actuating means for telescopically extending and folding said first, second, and third pairs of tubes comprising:
   a pair of actuating bars being longitudinally disposed in said third pair of tubes, each one of said pair of actuating bars comprising a lower guide with a chamfer being disposed on a bottom thereof and a upper guide with a chamfer being disposed upward from said lower guide;
   an actuating lever means being disposed on a top portion of said third pair of tubes comprising a lever being disposed therebetween, a pair of pins each being disposed transversely therein and fixed to said lever and having said actuating bar fixed thereto at tops thereof, and a pair of springs each being disposed in said top portions of said third pair of tubes between said pins and said id handle; and
   engaging means for engaging with said upper guide or said lower guide being disposed at said first and said second connecting means, each said engaging means comprising a protuberance transversely disposed in one of said first and second respective tubes of said third pair of tubes and a spring being disposed between a respective said connecting means and said protuberance for urging said protuberance in said respective tube, such that when said lever is pulled toward said handle, said actuating bars are upwardly displaced, drawing said chamfers of said guides against said protuberance, urging said protuberance outward, thereby allowing said tubes to displace telescopically.

* * * * *